US012688424B2

(12) United States Patent
Allahdadian et al.

(10) Patent No.: US 12,688,424 B2
(45) Date of Patent: Jul. 21, 2026

(54) ANOMALY DETECTION PERFORMANCE ENHANCEMENT USING GRADIENT-BASED FEATURE IMPORTANCE

(71) Applicant: Oracle International Corporation, Redwood Shores, CA (US)

(72) Inventors: Saeid Allahdadian, Vancouver (CA); Yuting Sun, Bellevue, WA (US); Navaneeth Jamadagni, South San Francisco, CA (US); Felix Schmidt, Niederweningen (CH); Maria Vlachopoulou, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 945 days.

(21) Appl. No.: 17/394,193

(22) Filed: Aug. 4, 2021

(65) Prior Publication Data

US 2023/0043993 A1 Feb. 9, 2023

(51) Int. Cl.
*G06N 3/084* (2023.01)
*G06F 17/18* (2006.01)

(52) U.S. Cl.
CPC ............. *G06N 3/084* (2013.01); *G06F 17/18* (2013.01)

(58) Field of Classification Search
CPC ...... G06F 17/18; G06F 2218/08; G06N 3/084
See application file for complete search history.

(56) References Cited

U.S. PATENT DOCUMENTS 11,537,902 B1 * 12/2022 Aydore ................. G06N 3/0455
11,798,090 B1 * 10/2023 Nazir ..................... G06N 3/084
(Continued)

FOREIGN PATENT DOCUMENTS

CA 3037326 1/2020
CA 3037326 A1 1/2020

OTHER PUBLICATIONS

Shilin He, Pinjia He, Zhuangbin Chen, Tianyi Yang, Yuxin Su, and Michael R. Lyu. 2021. A Survey on Automated Log Analysis for Reliability Engineering. ACM Comput. Surv. 54, 6, Article 130 (Jul. 2022), 37 pages. https://doi.org/10.1145/3460345 (Year: 2022).*
(Continued)

*Primary Examiner* — Omar F Fernandez Rivas
*Assistant Examiner* — Corey M Sackalosky
(74) *Attorney, Agent, or Firm* — Hickman Becker Bingham Ledesma LLP

(57) ABSTRACT

Herein are machine learning techniques that adjust reconstruction loss of a reconstructive model, such as a principal component analysis (PCA), based on importances of features. In an embodiment having a reconstructive model that more or less accurately reconstructs its input, a computer measures, for each feature, a respective importance that is based on the reconstructive model. For example, importance may be based on grading samples that the reconstructive model correctly or incorrectly inferenced. For each feature during production inferencing, a respective original loss from the reconstructive model measures a difference between a value of the feature in an input and a reconstructed value of the feature generated by the reconstructive model. For each feature, the respective importance of the feature is applied to the respective original loss to generate a respective weighted loss, which compensates for concept drift. The weighted losses of the features of the input are collectively detected as anomalous or non-anomalous.

18 Claims, 6 Drawing Sheets

COMPUTER 100

(56) References Cited

U.S. PATENT DOCUMENTS

| | | | |
|---|---|---|---|
| 2017/0169360 | A1 | 6/2017 | Veeramachaneni et al. |
| 2018/0109589 | A1 | 4/2018 | Ozaki et al. |
| 2018/0158078 | A1 | 6/2018 | Hsieh |
| 2020/0004616 | A1 | 1/2020 | Natsumeda |
| 2020/0381084 | A1 | 12/2020 | Kawas |
| 2021/0124981 | A1 | 4/2021 | Kim |
| 2022/0188410 | A1 | 6/2022 | Allahdadian et al. |
| 2022/0303288 | A1* | 9/2022 | Wang .................. H04L 63/1425 |
| 2023/0024884 | A1* | 1/2023 | Casserini .............. G06F 18/217 |

OTHER PUBLICATIONS

Chen, Zhuangbin & Liu, Jinyang & Gu, Wenwei & Su, Yuxin & Lyu, Michael. (2021). Experience Report: Deep Learning-based System Log Analysis for Anomaly Detection. 10.48550/arXiv.2107. 05908. (Year: 2021).*

Min Du, Feifei Li, Guineng Zheng, and Vivek Srikumar. 2017. DeepLog: Anomaly Detection and Diagnosis from System Logs through Deep Learning. In Proceedings of the 2017 ACM SIGSAC Conference on Computer and Communications Security (CCS '17). Association for Computing Machinery, New York, NY, USA, 1285 (Year: 2017).*

Xu Zhang, Yong Xu, Qingwei Lin, Bo Qiao, Hongyu Zhang, Yingnong Dang, Chunyu Xie, Xinsheng Yang, Qian Cheng, Ze Li, Junjie Chen, Xiaoting He, Randolph Yao, Jian-Guang Lou, Murali Chintalapati, Furao Shen, and Dongmei Zhang. 2019. Robust log-based anomaly detection on unstable log data. In Proceedings (Year: 2019).*

Ross, Gordon J., et al. "Exponentially weighted moving average charts for detecting concept drift", Pattern Recognition Letters 33.2 (Year: 2012).

Jaworski et al., "Concept drift detection using autoencoders in data streams processing", In International Conference on Artificial Intelligence and Soft Computing (Year: 2020).

Kamei et al., "The Effects of Over and Under Sampling on Fault-Prone Module Detection", Nara Institute of Science and Technology Academic Repository, ESEM 2007, dated Sep. 2007, 10 pages.

Altmann et al., "Permutation Importance: A corrected Feature Importance Measure", Department of Computational Biology and Applied Algorithmics, Max Planck Institute for Informatics, vol. 00, No. 00 2009, Year 2009, 8 pages.

Bach et al., A Bayesian Approach to Concept Drift, dated 2010, 9 pages.

Bontemps et al., "Collective Anomaly Detection Based on Long Short Term Memory Recurrent Neural Network", dated 2016, 12 pages.

Bornelöv et al., "Selection of Significant Features Using Monte Carlo Feature Selection", Springer International Publishing, Year 2016, 14 pages.

Carta et al., "A Local Feature Engineering Strategy to Improve Network Anomaly Detection", Department of Mathematics and Computer Science, University of Cagliari, dated Oct. 21, 2020, 30 pages.

Chawla, "Data Mining for Imbalanced Datasets: An Overview", Department of Computer Science and Engineering University of Notre Dame, https://www.researchgate.net/ publication/226755026, dated Jan. 2005, 16 pages.

Du et al. DeepLog: Anomaly Detection and Diagnosis from System Logs through Deep Learning, CCS'17, Oct. 30-Nov. 3, 2017, 14 pages.

Gama et al., "A Survey on Concept Drift Adaptation", ACM Computing Surveys, vol. 1, No. 1, Article 1, Publication date: Jan. 2013, 44 pages.

Golan et al., "Deep Anomaly Detection Using Geometric Transformations", 32nd Conference on Neural Information Processing Systems (NeurIPS dated 2018), Montréal, Canada, 12 pages.

Alexey Tsymbal, "The Problem of Concept Drift: Definitions and Related Work", dated Apr. 29, 2004, 7 pages.

Hasan et al., "Attack and Anomaly Detection in IoT Sensors in IoT Sites Using Machine Learning Approaches", Department of Computer Science and Engineering, Khulna University of Engineering & Technology, published by Elsevier B.V., Sep. 2019, 14 pages.

YuanZhong, Zhu, "Intrusion Detection Method based on Improved BP Neural Network Research", International Journal of Security and Its Applications vol. 10, No. 5 (2016) pp. 193-202.

Larasati et al., "Improve the Accuracy of Support Vector Machine Using Chi Square Statistic and Term Frequency Inverse Document Frequency on Movie Review Sentiment Analysis", Scientific Journal of Informatics, vol. 6, No. 1, dated May 2019, 21 pages.

Liu et al., "Imbalanced Text Classification: A Term Weighting Approach", Department of Industrial and Systems Engineering, The Hong Kong Polytechnic University, dated 2007, 12 pages.

Luo et al., "A Revisit of Sparse Coding Based Anomaly Detection in Stacked RNN Framework", dated Oct. 2017, 9 pages.

Naseer et al., "Enhanced Network Anomaly Detection Based on Deep Neural Networks", Journal of Latex Class Files, vol. 14, No. 8, Aug. 2015, 16 pages.

Nguyen et al., "GEE: A Gradient-Based Explainable Variational Autoencoder for Network Anomaly Detection", https://ieeexplore. ieee.org/abstract/document/8802833, Mar. 2019, 10 pages.

Panday et al., "Feature Weighting as a Tool for Unsupervised Feature Selection", Information Processing Letters, https://doi.org/ 10.1016/j.ipl.2017.09.005, Year 2017, 12 pages.

Tuor et al., "Deep Learning for Unsupervised Insider Threat Detection in Structured Cybersecurity Data Streams", dated Dec. 15, 2017, 9 pages.

Webb et al., Characterizing Concept Drift, Data Mining and Knowledge Discovery, dated Jul. 2016, 30 pages.

Yousefi-Azar et al., "Autoencoder-based Feature Learning for Cyber Security Applications", dated 2017, 8 pages.

HaddadPajouh et al, "A Two-layer Dimension Reduction and Two-tier Classification Model for Anomaly-Based Intrusion Detection in IoT Backbone Networks", dated 2016, 12 pages.

Ross et al., "Exponentially weighted moving average charts for detecting concept drift." Pattern Recognition Letters 33.2 (Year: 2012).

* cited by examiner

COMPUTER 100

301 For each feature, measure respective importance that is based on reconstructive model 302 For each feature, measure respective original loss from reconstructive model 303 For each feature, generate respective weighted loss based on original loss of feature and importance of feature 304 Detect that weighted tuple loss is anomalous

FIG. 4

FORMULA 401

$$G = 2 \cdot (I - \omega^T \omega)$$

FORMULA 402

$$g = \frac{1}{N} (X \cdot G)$$

FORMULA 403

$$\frac{\partial MSE}{\partial X} = \frac{1}{N} 2X[I - \omega^T \omega]$$

FORMULA 404

$$Z = \frac{\overline{Y_{TP}} - \overline{Y_{FP}}}{\sqrt{\sigma_{Y_{TP}}^2 + \sigma_{Y_{FP}}^2}}$$

FORMULA 405

$$\gamma_i = e^{z_i}$$

FORMULA 406

$$Weighted\_MSE_j = \frac{1}{N} \sum_{i=1}^{N} (\gamma_i (X_{i,j} - \hat{X}_{i,j})^2)$$

SOFTWARE SYSTEM 600

602

602A

APPLICATION PROGRAM 1

602B

APPLICATION PROGRAM 2

602C

APPLICATION PROGRAM 3

[...]

602N

APPLICATION PROGRAM N

OPERATING SYSTEM
(e.g., WINDOWS, UNIX, LINUX, MAC OS, IOS, ANDROID, OR LIKE)

610

GRAPHICAL USER INTERFACE (GUI)

615

VIRTUAL MACHINE MONITOR ( VMM)

630

BARE HARDWARE (e.g., COMPUTING DEVICE 500)

ANOMALY DETECTION PERFORMANCE ENHANCEMENT USING GRADIENT-BASED FEATURE IMPORTANCE

RELATED CASE

Incorporated herein by reference in its entirety is related U.S. patent application Ser. No. 17/123,235 "Anomaly Detection in SS7 Control Network Using Reconstructive Neural Networks" filed Dec. 16, 2020 by Hamed Ahmadi et al.

FIELD OF THE INVENTION

The present invention relates to reconstructive models such as principal component analysis (PCA) for anomaly detection. Herein are machine learning techniques that adjust reconstruction loss based on respective importances of features.

BACKGROUND

Anomaly detection is an important tool with various use cases in security such as fraud detection and intrusion detection. A powerful approach recently employed in anomaly detection involves machine learning models such as reconstructive neural nets such as an autoencoder. Anomaly detection using such models can be categorized into two groups of existing techniques. In the first group, the entire dataset is used for model training, and the reconstructive model is used to detect anomalies inside that dataset. In the second group, the data is discretized into three parts: training, validation, and test. The reconstructive model is trained on the training dataset and then fine-tuned using the validation dataset. Subsequently the trained and validated model is applied to the test dataset. The test dataset can be a nearly infinite stream of data incoming to the reconstructive model. Although such models can be made somewhat robust to input noise, they cannot handle input data distribution changes, which is a phenomenon called concept drift or data drift.

In one example, concept drift occurs when a series of inputs evolves over time such that later normal inputs have feature values that are no longer within the value range of earlier normal inputs such as training inputs. For example, a reconstructive model may be a classifier that learned to distinguish normal tree seedlings from normal weeds because seedlings are smaller than weeds. However over time, seedlings may grow to be a same size as weeds or grow into trees that are bigger than weeds, which may confuse the classifier. For example, the classifier may mistakenly classify an older seedling as a weed.

Concept drift may have various causes. For example, seasonality may cause a normal temperature range to shift such that a normal temperature may be mistakenly detected as anomalous or an abnormal temperature may be mistakenly detected as non-anomalous. Seasonality may influence consumer preferences which may interfere with a predictive machine learning model for a supply chain or for behavioral advertisement targeting.

Concept drift naturally happens in many or most real-world systems, where the system is inherently dynamic or dependent on dynamic parameters such as the evolving state of a server machine in time. Such shifts in data are usually inevitable because the system is dynamic and cannot be controlled or predicted in every aspect. Moreover, machine learning model performance is highly dependent on the distribution of previous data involved during a training phase. After fitting to training data, a machine learning model may be unable to handle concept drift.

In industry, an existing solution for concept drift is usually to retrain the machine learning model with new data, in which case, the retrained model learns the new distribution of the data and can do well in detecting anomalies happening after the concept drift that necessitated retraining. However, a sufficient amount of data is needed after the concept drift in order to be able to retrain the model, which means, in some applications, several hours or days need to pass to be able to accumulate enough real data from a concept drift before retraining. In addition, retraining a machine learning model and redeploying it after a concept drift usually takes a significant amount of time. In those ways, retraining may impose a somewhat prolonged service outage of a machine learning model.

Machine learning-powered anomaly detection (AD) has been widely in use in recent years. Nonetheless, there are still obstacles that need to be faced. As a usual practice in industry for detecting anomalies using machine learning models, the data is separated into three partitions each being used in a particular phase. These are called training, validation and test. The train and validation data are used to train the machine learning model in the training phase and then validate its results using fine tuning of hyperparameters in the validation phase. During the inference phase, the test data is assessed using the trained machine learning AD model to detect possible anomalies. While the train and validation phases are usually offline and use a preexisting corpus, the test data can instead be generated and captured in an online (i.e. live) manner. Live anomaly detection is also referred to as real time anomaly detection.

In the real world, the majority of data sources have underlying factors that are dynamic and changing with different rates in time. This results in changing the normal patterns present in the training and validation data and introduces new patterns. Since the AD model has been trained offline and did not see the new patterns, these will be detected falsely by the AD as anomalies. This change in the data generation patterns is also referred to as concept drift.

In industry the usual solution is to capture enough data from the time the accuracy of the system falls and then retrain the AD model on a new data source. This repeats over time as new concept drifts arise. The determination of the accuracy of the system is also done usually manually by grading some or all correctly or incorrectly detected anomalous data points. However, this approach has important disadvantages.

Another challenge faced in usual AD models used in industry is a lack of explainability. While traditional AD models only focus on designing complex machine learning algorithms or deep learning neural nets to improve prediction accuracy, the reasoning and explanation of why a data point is detected as anomalous or normal is usually not present.

The usual approach used in the industry has several downfalls. First, the approach is passive, which means that the accuracy of a machine learning model has to fall and then retraining would start. Second, after a concept drift and accompanying drop in accuracy, a considerable amount of time is needed to capture enough data to train a model and then redeploy it into production. This results in unavailability of an accurate anomaly detector in service for a considerable amount of time.

3

BRIEF DESCRIPTION OF THE DRAWINGS

In the drawings:

FIG. 4 depicts example mathematical formulae for preparing or using feature importances;

DETAILED DESCRIPTION

Figure 1:
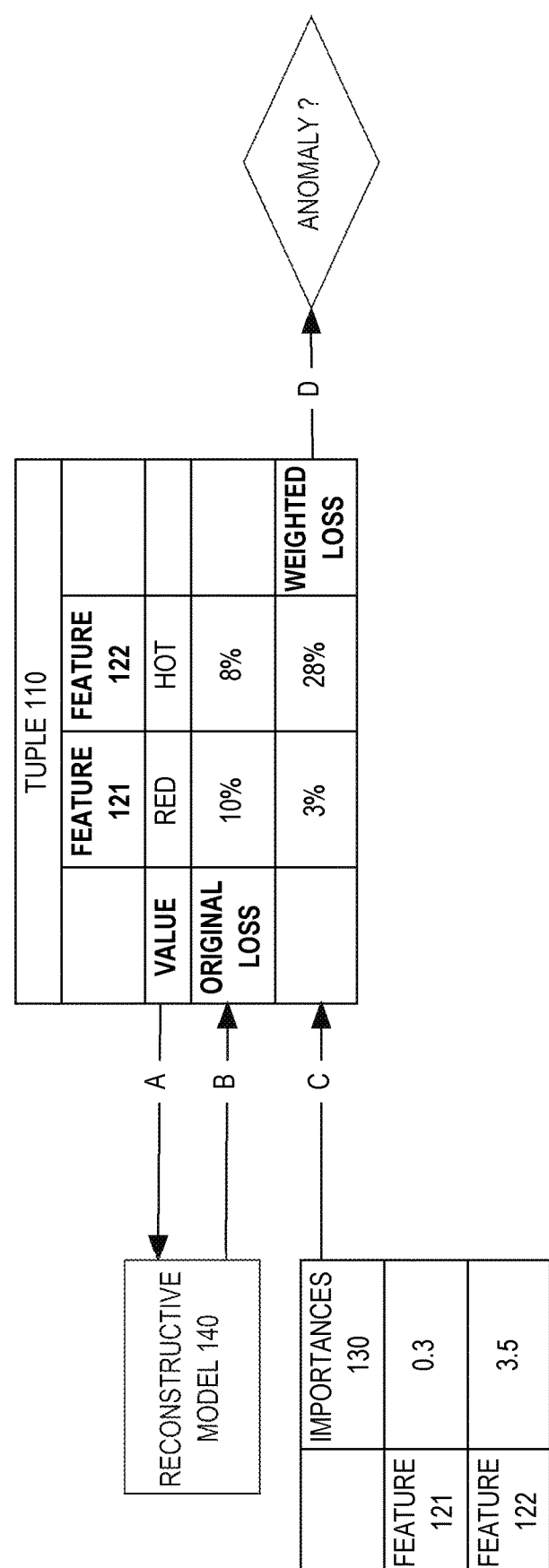
FIG. 1 is a block diagram that depicts an example computer that applies machine learning (ML) techniques to adjust reconstruction loss of a reconstructive model, such as a principal component analysis (PCA), based on importances of features.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

A reconstructive model is a machine learning (ML) model that can encode and decode a complex input, wherein decoding entails more or less accurate reconstruction of the original input from the encoding. For example, a reconstructive model may be an unsupervised principal component analysis (PCA) for anomaly detection. Herein are machine learning techniques that adjust quantifiable reconstruction loss based on respective importances of values of features.

Herein is an explainable supervised gradient-based (GRAD) framework to create importance weights corresponding to input features by identifying the main features that reveal anomalies. The approach combines two techniques. The first technique uses a supervised gradient-based framework to compute feature importance weights. The second technique post-processes anomaly scores with the obtained feature importance weights to enhance unsupervised anomaly detection (AD) accuracy. This approach provides model interpretability and compensates for concept drifts in input data, so that the overall AD performance improves.

A new robust anomaly detection framework is presented which can handle concept drift in a supervised manner. Herein, grading entails correctly labeling a data point after the data point is correctly or incorrectly inferenced by a machine learning model. This approach may use graded data points to create feature importance weighting factors which effectively increase the accuracy of the unsupervised AD system in real time. In an embodiment, AD is based on PCA. Other AD models such as neural nets can be used as well.

This framework is fast and does not need intense extra calculation. Thus, this framework can be embedded into real-time applications. By applying the importance weights calculated from this methodology, anomaly scores provided by a reconstructive model are modified to increase the accuracy of the reconstructive model, which increases true positives and decreases false positives.

This methodology is explainable according to an ML explainability (MLX) approach. Several metrics can be derived from graded data points to explain the results of the reconstructive model according to the contribution of each input feature. Compared to other feature selection methods or embedded feature weighting methods that require large space and time complexity, this approach is innovative and low overhead at converting feature gradients into the feature importance domain by analyzing how influential are feature gradients at causing true and false positives.

This framework computes feature importances in real time using gradients to increase inference accuracy. Being robust to noise and concept drift is innovative. In an embodiment during production inferencing, the computation of gradients is based on a mean squared error (MSE) loss function with respect to each feature and using a statistical z-score to create a respective importance weighting factor on each feature from graded data points. Other approaches need intense computation, have latency too high for real-time use, and are too cumbersome to use in an embedded application with high-dimensional data, especially as naturally occurs in industry.

This approach robustly fine tunes the reconstructive model according to new data using points that can be graded in real time in an active manner without needing to retrain the reconstructive model, which avoids a service outage. This approach is efficient with little computational overhead. Feature importances may also be used for weighting feature loss and/or for MLX.

This gradient-based framework is highly extensible to a variety of reconstructive model architectures, including complex and/or opaque models. Due to application neutrality of this approach, reconstructive anomaly detectors herein may be configured and trained for various domains such as network intrusion detection and datacenter health monitoring. For example, anomalies may be reliably detected in inputs consisting of individual or groups of items such as network packets or multi-packet messages, server or console log entries, database records or queries, or semi-structured documents such as JavaScript object notation (JSON) or extensible markup language (XML).

In an embodiment having a reconstructive model that more or less accurately reconstructs its input, a computer measures, for each feature, a respective importance that is based on the reconstructive model. For example, importance may be based on grading samples that the reconstructive model correctly or incorrectly inferenced. For each feature during production inferencing, a respective original loss from the reconstructive model measures a difference between a value of the feature in an input and a reconstructed value of the feature generated by the reconstructive model. For each feature, the respective importance of the feature is applied to the respective original loss to generate a respective weighted loss, which compensates for concept drift. The weighted losses of the features of the input are collectively detected as anomalous or non-anomalous.

1.0 Example Computer

FIG. 1 is a block diagram that depicts an embodiment of an example computer 100 that applies machine learning (ML) techniques to adjust reconstruction loss of reconstructive model 140, such as a principal component analysis (PCA), based on importances 130 of features 121-122. Computer 100 may be one or more of a rack server such as a blade, a personal computer, a mainframe, a virtual computer, a smartphone, or other computing device.

1.1 Reconstructive Model

Computer 100 stores and operates reconstructive model 140 that is an ML model, such as a PCA as discussed later herein, in memory. Reconstructive model 140 is operated to process a complex input, such as tuple 110, to generate an inference such as a prediction or classification. Reconstructive model 140 is any ML model that also more or less accurately regenerates its input, which includes features 121-122. Input reconstruction has different purposes at different phases in the lifecycle of reconstructive model 140 as follows.

Reconstructive model 140's lifecycle has two phases, which are laboratory training followed by production inferencing. Learning occurs during training, which input reconstruction may improve. Learning may entail internal adjustment of reconstructive model 140 based on measured error of model inferences. In other words, inferencing by reconstructive model 140 occurs during training and also during operation in production. Herein, reconstructive model 140 is already trained. In various embodiments and as explained later herein, training of reconstructive model 140 is supervised or unsupervised.

1.2 Input Data

Tuple 110 is a realistic and possibly distinct combination of respective values for features 121-122. For example as shown, the value of feature 121 in tuple 110 is red. Inferencing occurs when reconstructive model 140 is applied to a tuple as shown by arrow A that indicates injection of the values of tuple 110 into reconstructive model 140. As explained later herein, arrows A-D occur in a temporal ordering as their lettering suggests. For example, arrow A occurs first, and arrow D occurs last.

1.3 Respective Importance of a Feature

To compensate for concept drift that may decrease the inference accuracy of reconstructive model 140 in a production environment, computer 100 uses importances 130 of respective features 121-122, thereby increasing the accuracy of reconstructive model 140. Importances 130 are numeric weights that indicate the relative natural significance of each feature in any tuple such as tuple 110 that is discussed later herein.

In various embodiments, importances 130 range from zero to one such as a probability that a feature is important or is the most important feature or from zero to a hundred such as a percentage of relative importance. In various embodiments, importances 130 must or might not sum to a probability of one or a hundred percent, or can or cannot sum to more than one or a hundred. For example, the respective importances of features 121-122 are 0.3 and 3.5 as shown and may be neither a probability nor a percent as discussed later herein. In any case, a higher importance value indicates greater importance, and zero indicates irrelevance.

Ideally, feature importance is more or less a covariance between values of a feature and labels of tuples. A label is a known correct inference for a tuple. Thus, a particular feature is more important if one, some, or all values of the feature in tuples is correlated with variations in the labels of the tuples such that the feature appears to cause the labels. Conversely, a particular feature is less important if variations in the value of the feature is uncorrelated with variations in the labels of the tuples such that the feature has little or no effect on the labels.

1.4 Example Uses of Feature Importances

Because of how importances 130 are measured herein, importances 130 have some operational advantages. Techniques for generating importances 130 are model-agnostic and those techniques can be used for different ML models regardless of the architecture, algorithm, and hyperparameter settings of an ML model and even if those model details are unintelligibly complex or unavailable such as with a so-called black box (i.e. opaque) ML model. For example, computer 100 can generate and/or use importances 130 even if reconstructive model 140 is instead hosted on a different computer so long as the different computer sends feature reconstruction loss measurements, as discussed later herein, back to computer 100.

As discussed later herein, an embodiment may rank (i.e. sort) features by importance. After training, importances may facilitate ML explainability (MLX) that generates explanations of ML model behavior, and importances are or are not expressly included in an explanation.

1.5 Input Features

In an embodiment, an input tuple is provided as a feature vector (not shown) that contains a respective value for each of all features 121-122. In an embodiment, the feature vector is homogenous such that respective values of all features are encoded as a same datatype such as a same primitive datatype such as an integer or a unit normalized real number such as floating point. In an embodiment, the feature vector is heterogenous such that each feature may have its own respective datatype.

In an embodiment, a sequential feature such as a calendar month may be encoded as a zero or one based unsigned integer such as 1-12 instead of as text strings such as January. In an embodiment, categorical features such as a feature of unordered and mutually exclusive choices such as tea flavors may be so-called one-hot encoded as a group of mutually exclusive Boolean features. For example, one choice from three flavors may be encoded into three Boolean features in which the corresponding feature is true and the two other Boolean features are false in the feature vector. In an embodiment, a Boolean feature is encoded as a number.

The implementation of a feature's loss function compares the original and reconstructed values of the feature to calculate a numeric score that measures a magnitude of a difference between the original and reconstructed values of the feature. In various embodiments, respective loss functions of different features each returns a reconstruction loss in a same or different numeric range that is respectively normalized or not. For example, some or all loss functions may return a real number in the range of zero to one where zero means perfect reconstruction of an exact match and one means that the reconstruction has no resemblance to the original value. Here loss is, mathematically or informally, the opposite of accuracy.

Techniques herein are robust to support other loss ranges that may include negative and positive values and/or unnormalized values. Compensation for such diversity of values may entail squaring and/or range normalization.

1.6 Principal Component Analysis (PCA)

Importance measurement techniques herein are supervised and based on labeled tuples. However, a distinction of importance measurement techniques herein versus other approaches is that training of reconstructive model 140 may be supervised or unsupervised, and the training corpus used to train reconstructive model 140 may or may not be labeled. Thus unlike some approaches, techniques herein are well suited for unsupervised ML models.

In various embodiments, reconstructive model 140 variously is an ML model that is unsupervised trained such as a PCA, an autoencoder, a recurrent neural network (RNN), a variational autoencoder (VAE), or an incremental PCA (IPCA). For demonstration, autoencoder and PCA models are discussed as exemplary embodiments as follows.

In an embodiment, reconstructive model 140 is a PCA model. A rich training corpus presents a vast and multidimensional problem space that may need a sophisticated ML model such as PCA that is intensely trained with a wide variety of anomalous and non-anomalous tuples. Training incrementally improves a PCA model as follows.

During training, the PCA model is incrementally reconfigured to compute an additional principal component until enough of the variance in tuples in the training corpus is explained by principal components as discussed below. Tuples consist of features 121-122 that may be more or less correlated. For example due to growth, a person's age and height and weight tend to be positively correlated, and some features may be negatively correlated or uncorrelated.

Thus, correlation (i.e. covariance) can be measured for each possible pair of two features. Each pair of features may become a principal component that is represented as a dimension in a multidimensional solution space. Each tuple may be a point in that multidimensional solution space.

Feature pairs incrementally become principal components in a natural ordering of decreasing magnitude of covariance to maximize initial separation of tuples in the solution space. For example, a pair of features that are uncorrelated across all tuples would be added last if ever.

There are two mutually exclusive ways of unsupervised training. One way entails learning to minimize reconstruction error such as discussed later herein for an autoencoder. The other way, such as for PCA, entails clustering tuples into the multidimensional solution space. For PCA, adding a next principal component adds another dimension to the solution space, which causes a rearrangement of clusters of the tuples in the solution space.

Initially in training, there are few dimensions and no clusters or many small clusters. Ideally, a majority cluster emerges as non-anomalous, and remaining small cluster(s) are anomalous. Due to high dispersion and lack of clustering, the few initially added dimensions provide most of the variance that would ever occur, no matter how many principal components are later added. However, adding another principal component contributes (i.e. explains) at least a little more variance. Training ceases iteratively adding principal components when explained variance exceeds a threshold such as 99%.

By the time training ceases iterating, many principal components may have been added. Whether by iteration or by initial configuration, the PCA model may be configured to compute (i.e. use as dimensions) hundreds or thousands of principal components. Due to combinatorics, a thousand principal components may be based on fewer than a thousand features. For example, there are over a thousand pairwise combinations possible with only fifty features.

1.7 Autoencoder

In an embodiment, reconstructive model 140 instead is an autoencoder. Backpropagation training of an artificial neural network (ANN) such as an autoencoder as discussed later herein may be driven by model loss. With supervised training, model loss may be measured by comparing an inference by an ML model to a predefined label that is already established as the correct inference. With unsupervised training, such as with an autoencoder, predefined labels may be unavailable, and loss may instead be measured based on diagnostic output from the autoencoder as follows.

In an embodiment, an autoencoder may be a multilayer perceptron (MLP) that generally provides dimensionality reduction, regardless of whether the autoencoder is used for classification or anomaly detection. As discussed above, classification entails associating an inferred label with a complex input. In other words, classification entails recognizing a learned pattern. Anomaly detection does the opposite, which is recognizing that an input does not match any learned pattern.

In any case, an autoencoder provides dimensionality reduction, which entails: a) avoiding analysis and integration of irrelevant features of an input, and b) generating a more concise internal neural representation of the input in which only meaningful input features are retained. In other words, an autoencoder extracts semantic details of a complex, noisy, and fuzzy input. Thus, the autoencoder converts a sparse representation of an input into a dense encoding. Features and feature representation are discussed later herein.

Generally during training, an autoencoder learns which features should be deemphasized and how to encode retained semantic features. An autoencoder herein further is a reconstructive model because the autoencoder contains additional neural layers that are trained to regenerate the original input (i.e. tuple). In other words, the autoencoder encodes input into a semantic coding, which the autoencoder further decodes back into a more or less accurate copy of the input.

1.8 Reconstruction Loss

A measured difference between the original input and the regenerated input is known as reconstruction loss. Because the original input and the regenerated input are composed of individual features, a difference may be measured between an original feature and a reconstructed feature to calculate a respective reconstruction loss for that feature, shown as original loss that reconstructive model 140 provides as shown by arrow B. In other words, a respective original loss may be measured for each of features 121-122. For example as shown, feature 121 has an original loss of ten percent. For example if red is reconstructed as pink, then the loss is small, but if red is reconstructed as blue then the loss is large.

In various embodiments, loss for one feature ranges from zero to one such as a probability that the reconstructed feature is inaccurate or from zero to a hundred such as a percentage of difference between the reconstructed feature and the original feature. In various embodiments, losses for features 121-122 must or might not sum to a probability of one or a hundred percent, or can or cannot sum to more than one or a hundred.

In any case, a lower loss indicates greater accuracy, and zero indicates that the reconstructed feature is identical to the original feature. Conversely, a maximum loss indicates that the reconstructed feature has no resemblance to the original feature. Although presented as an empirically observed measurement, reconstruction loss actually is calculated by a loss function as discussed later herein.

For one input tuple, reconstructive model 140 may generate two outputs that are: a) a more or less accurate inference and b) the feature reconstruction losses. In contrast to reconstruction loss, inference error is a difference between the actual inference by reconstructive model 140 and the known correct inference (i.e. label). When reconstructive model 140 is used for (e.g. binary) classification such as anomaly detection, reconstruction loss may be used as a proxy for inference error and, as discussed later herein, a proxy for the inference itself. Such use of reconstruction loss is especially important for unsupervised learning because, without predefined labels, inference error may be more or less impossible to measure. Thus reconstruction loss, instead of inference error, may be used for unsupervised learning by a reconstructive model such as for backpropagation for unsupervised training of an autoencoder.

1.9 Value Loss and Tuple Loss

Herein are two granularities of reconstruction loss that may have a same scale and a same unit of measurement. Value loss is reconstruction loss for one feature in one tuple. Tuple loss is an aggregate of value losses of all features in one tuple.

Aggregation, such as summing or averaging, of respective value losses of all features 121-122 may be used to calculate tuple loss that measures how much relevant information did reconstructive model 140 lose when inferencing for an input tuple. As discussed below, loss may indicate reconstruction loss that occurs in a regenerated input as compared to the original input. Loss is informally or mathematically the opposite of inference accuracy. That is, the higher is tuple loss, the less reliably did reconstructive model 140 recognize an input.

For anomaly detection, high tuple loss, such as exceeding a threshold, may indicate that the tuple is anomalous, in which case an embodiment of computer 100 in a production environment may react in various ways such as alerting an operator, rejecting tuple 110 from further processing, further processing tuple 110 with heightened security constraints, diverting tuple 110 for intensive manual or automatic scrutiny, logging tuple 110, and/or adding tuple 110 into a training corpus for eventually retraining reconstructive model 140. For example, tuple 110 may be suspicious as malicious, accidentally erroneous, or indicative of a malfunction. For example, tuple 110 may be one or more of a network packet, an entry in a log of a server or a console, a database record, or a semi-structured document such as JavaScript object notation (JSON) or extensible markup language (XML). In an embodiment, tuple 110 is a signaling system 7 (SS7) telecommunications message, and reconstructive model 140 is configured, trained, and operated according to techniques herein and as presented in related U.S. patent application Ser. No. 17/123,235.

1.10 Weighted Loss

As discussed above, an inference for anomaly detection can be based on a tuple loss that is an aggregation of value losses of features 121-122. A technical problem with loss aggregation is that, as explained above, some features are more important than others because those features have a greater effect on the inference. Thus, original loss for one feature may be more important than an original loss for another feature.

Importances 130 indicate relative respective importance of features 121-122. The original losses of features 121-122 are respectively adjusted by applying importances 130 as respective weighting coefficients, as shown by arrow C, to calculate respective weighted losses for features 121-122 such as by multiplication. For example as shown, the weighted loss of feature 121 is 0.3×10%=3%. In other words, the value of feature 121 is less important, and its loss is decreased by weighting.

Conversely, the value of feature 122 is more important, and its loss is increased by weighting. Thus counterintuitively and due to weighting, a feature of relatively less original loss may have relatively more weighted loss than other features and vice versa. Implications of weighting are discussed below. The shown original losses and weighted losses are value losses as defined above.

1.11 Anomaly Detection

As mentioned earlier herein, training is not the only lifecycle phase of an ML model, and learning is not the only purpose of input reconstruction. The two lifecycle phases of laboratory training and production inferencing are rigid such that all machine learning occurs in the training environment, and no learning occurs in the production environment.

As explained above, anomaly detection entails recognizing that a complex input matches no learned pattern. In other words, anomaly detection entails recognizing unfamiliarity. By definition, an anomalous input is unlike other inputs. Whether a current input is by itself anomalous depends only on current reconstruction losses for the features of the current tuple, which has the following implications.

Accurate input reconstruction is eventually achieved during training. Without training, accurate reconstruction is impossible, in which case reconstruction loss is high. By definition, an unfamiliar input is any input that reconstructive model 140 was not trained for. Thus an unfamiliar input in training or in a production environment necessarily causes a high reconstruction loss.

An input that is unfamiliar (i.e. unrecognizable) to reconstructive model 140 is presumably anomalous, which is detectable due to its high reconstruction loss. Thus, reconstructive model 140 detects an anomaly when tuple loss, such as measured by mean squared error (MSE) or summation, exceeds an anomaly threshold as shown by arrow D and the decision diamond. For example, losses of features 121-122 may have a sum or mean. However due to weighting, a sum or mean of original losses may be more or less than a sum or mean of weighted losses.

The shown weighted losses are value losses but, by aggregation, weighted tuple loss may be calculated based on weighted value losses. Thus, weighting may cause value loss and/or tuple loss to increase as shown or decrease. In some counterintuitive cases, tuple 110 would have been anomalous according to original feature losses but instead is non-anomalous according to weighted tuple loss or vice versa. Thus, importances 130 may effectively reinterpret the output of reconstructive model 140 to increase the accuracy of reconstructive model 140.

1.12 Concept Drift

In a production environment, an unfamiliar input is an anomaly, which is detectable due to its high reconstruction loss. Thus, reconstructive model 140 detects an anomaly when a reconstruction loss exceeds an anomaly threshold. However even in a production environment, an anomaly is not the only possible cause of reconstruction loss.

In a production environment, drift also causes reconstruction loss such as concept drift, a.k.a. data drift. In one example, concept drift occurs when a series of inputs evolves over time such that later normal inputs have feature values that are no longer within the value range of earlier normal inputs such as training inputs.

Concept drift may have various causes. For example, seasonality may cause a normal temperature range to shift such that a normal temperature may be mistakenly detected as anomalous or an abnormal temperature may be mistakenly detected as non-anomalous. Seasonality may influence consumer preferences which may interfere with a predictive ML model for a supply chain or for behavioral advertisement targeting.

Concept drift may occur in technical environments such as internet of things (IoT) telemetry or enterprise operations monitoring. For example, as operational trends cause a datacenter's inventory to grow or cause operations to span additional datacenters, various evolutionary changes may occur. For example, contents and patterns of network traffic may evolve, and contents of console logs may evolve. Even a disturbance as innocuous as a software application upgrade or patch may cause such contents and patterns to shift. Thus, natural indications of operations as normal or anomalous may have different value ranges at different times such as according to various gradual trends or sudden planned changes such as according to capacity planning.

Such concept drift causes reconstruction loss that, in known approaches, an anomaly detector such as PCA will be unable to distinguish from an actual anomaly such as an accidental outage or a malicious intrusion. In other words and according to known approaches, concept drift causes an anomaly detector to raise a false alarm. If that anomaly detector repeatedly or continuously raises false alarms, the anomaly detector may become more or less useless for two reasons. First, system administrators waste much time with manual forensics and diagnostics to decide whether an alarm is correct or not. Second, system administrators learn to ignore the malfunctioning anomaly detector such that a true alarm for a real problem goes unnoticed.

1.13 Model Decay

A natural consequence of increasing reconstruction loss due to concept drift is model decay in which reconstructive model 140 gradually loses accuracy over time in a production environment until eventually becoming useless. Techniques herein dynamically adjust importances 130 in the production environment to compensate for concept drift, thereby preventing model decay, which extends the service life of reconstructive model 140. Thus even without retraining, an anomaly detector herein may remain in service and usefully operating long after an anomaly detector with another approach would be rendered entirely useless.

In an embodiment, reconstructive model 140 is periodically retrained with more recent historic tuples that occurred after concept drift. For example, reconstructive model 140 may be automatically retrained such as by a periodically scheduled program such as nightly or weekly or monthly that is more frequent than occurrences of excessive concept drift. That is, near the end of such a period, a small amount of concept drift may have occurred, but reconstructive model 140 never decays enough to become useless so long as some new tuples can be (e.g. manually) labeled and used to adjust importances 130 in the production environment.

Thus a production embodiment may have three temporal granularities that, in increasing order, are inferencing a new tuple, grading (i.e. labeling to establish inferences as correct or incorrect) new tuple(s), and retraining reconstructive model 140 that may be more or less indefinitely deferred. Depending on the embodiment, recalculating importances 130 may occur immediately after grading or, because some embodiments recalculate importances 130 in constant time complexity based on matrix mathematics presented later herein, immediately before inferencing as explained below.

2.0 Loss Weighting Process

Figure 2:
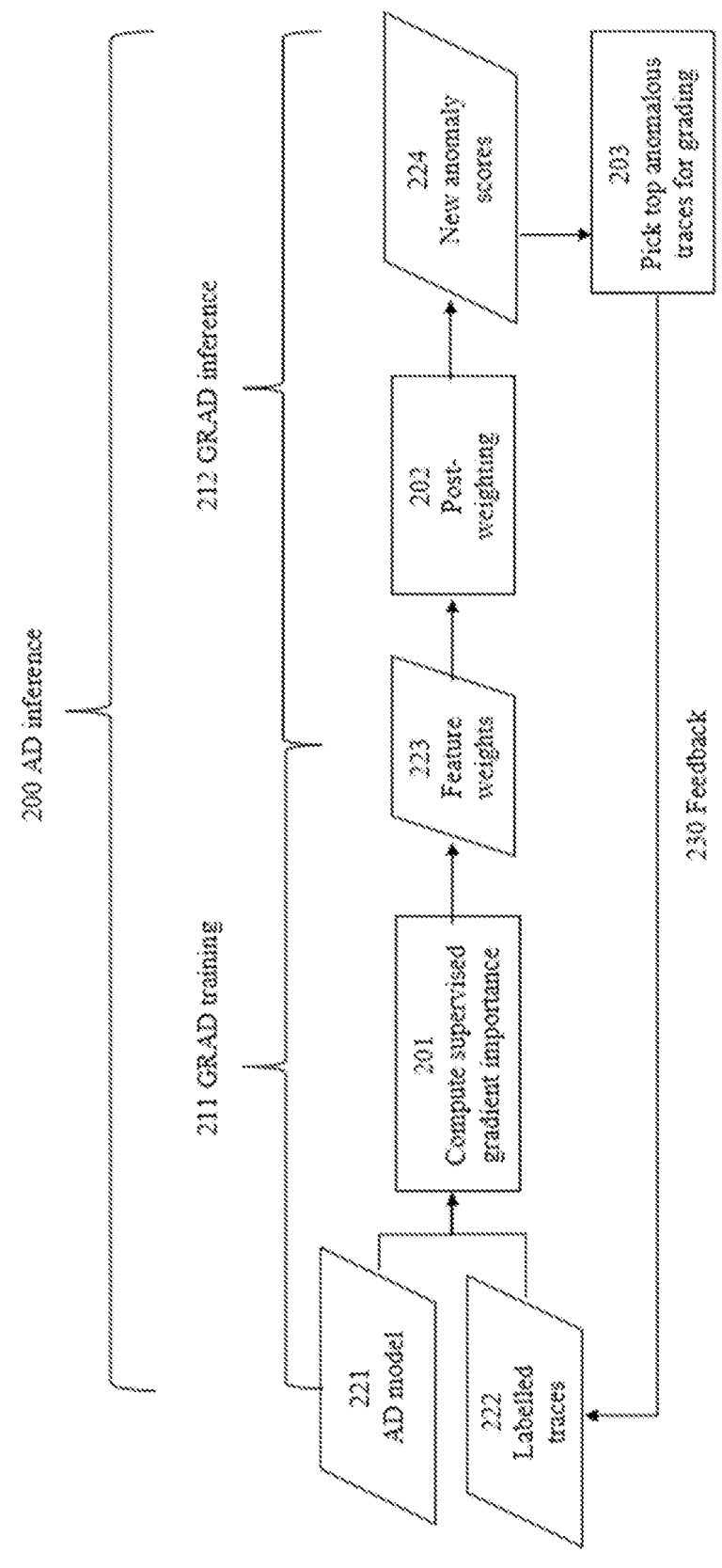
FIG. 2 is a flow diagram that depicts an example computer process to measure and apply feature importances for anomaly detection in a production environment.

FIG. 2 is a flow diagram that depicts an example process that an embodiment of computer 100 may perform to measure and apply feature importances for anomaly detection in a production environment. This embodiment of computer 100 includes design choices made to integrate computer 100 for a particular software application in a particular production environment. FIG. 2 is discussed with reference to FIG. 1.

In this embodiment, steps 201-203 occur while anomaly detection (AD) model 221 (that may be reconstructive model 140) generates AD inference 200 for a new tuple (not shown) that may be tuple 110. In this embodiment, generation of AD inference 200 entails supervised gradient (GRAD) training of feature weights 223 (that may be importances 130) followed by unsupervised GRAD inference 212 that generates AD inference 200.

In this embodiment, each tuple is a so-called trace of an event, action, command, or message. For example, a trace may consist of multiple related syntactic units such as a network packet or a line of text in a server log or a console log. Labelled traces 222 consists of (preferably) recent tuples that are labeled. Labelled traces 222 should be recent enough to include concept drift. For bootstrapping, labelled traces 222 may be selected from a training corpus.

In this embodiment, receiving a new tuple causes steps 201-203 in phases 211-212. Although step 201 and GRAD training 211 are caused by receiving the new tuple, the new tuple is not used until step 202 during GRAD inference 212. Step 201 computes supervised loss gradients based on AD model 221 and labelled traces 222.

In a principal component analysis (PCA) embodiment as explained later herein, step 201 may calculate gradients using matrix mathematics based on, as explained earlier and later herein, covariances of pairs of features. In a neural network embodiment such as an autoencoder, step 201 may instead calculate gradients using backpropagation as explained later herein. In a universal embodiment that can be used with any reconstructive model 140 of any (e.g. opaque) model architecture that provides original (i.e. unweighted) reconstruction loss as value losses and/or tuple loss, step 201 may calculate gradients using partial derivatives based on original reconstruction losses and values of features of labeled tuples.

According to mathematics presented later herein, step 201 measures feature weights 223 based on gradients. Thus, feature weights 223 are the result of GRAD training 211, after which GRAD inference 212 begins. Although not shown, before step 202, GRAD inference 212 applies AD model 221 to the new tuple to reconstruct the new tuple and, based on the reconstruction, generate an original value loss for each feature.

Original loss may be distorted (i.e. inaccurate) due to concept drift. According to mathematics presented later herein, post-weighting step 202 compensates for concept drift by multiplicatively applying feature weights 223 to the original losses to generate a weighted loss for each feature. Weighted losses of the new tuple can be arithmetically combined, such as by averaging or summing as discussed later herein, to generate an anomaly score that, when compared to a threshold, indicates whether or not the new tuple is anomalous. Performing step 202 for multiple new tuples generates new anomaly scores 224.

However in this embodiment, anomaly detection does not complete GRAD inference 212 that includes additional step 203 that (e.g. manually) labels only those new tuples that have the highest (i.e. most anomalous) anomaly scores. Shown as feedback 230, newly labeled tuples are included into labelled traces 222. In that way, labelled traces 222 evolve to reflect concept drift.

In an embodiment, step 203 batches and recurs according to a fixed temporal period, a fixed count of new tuples, or a fixed count of positive inferences. In an embodiment, feedback 230 is a labeled batch of recent tuples that entirely replaces labelled traces 222 or replaces a subset having an equal count of oldest labelled traces 222. In an embodiment, feedback 230 replaces a subset that is older than a threshold duration or older than a threshold count of repetitions of feedback 230.

3.0 Loss Weighting Process

Figure 3:
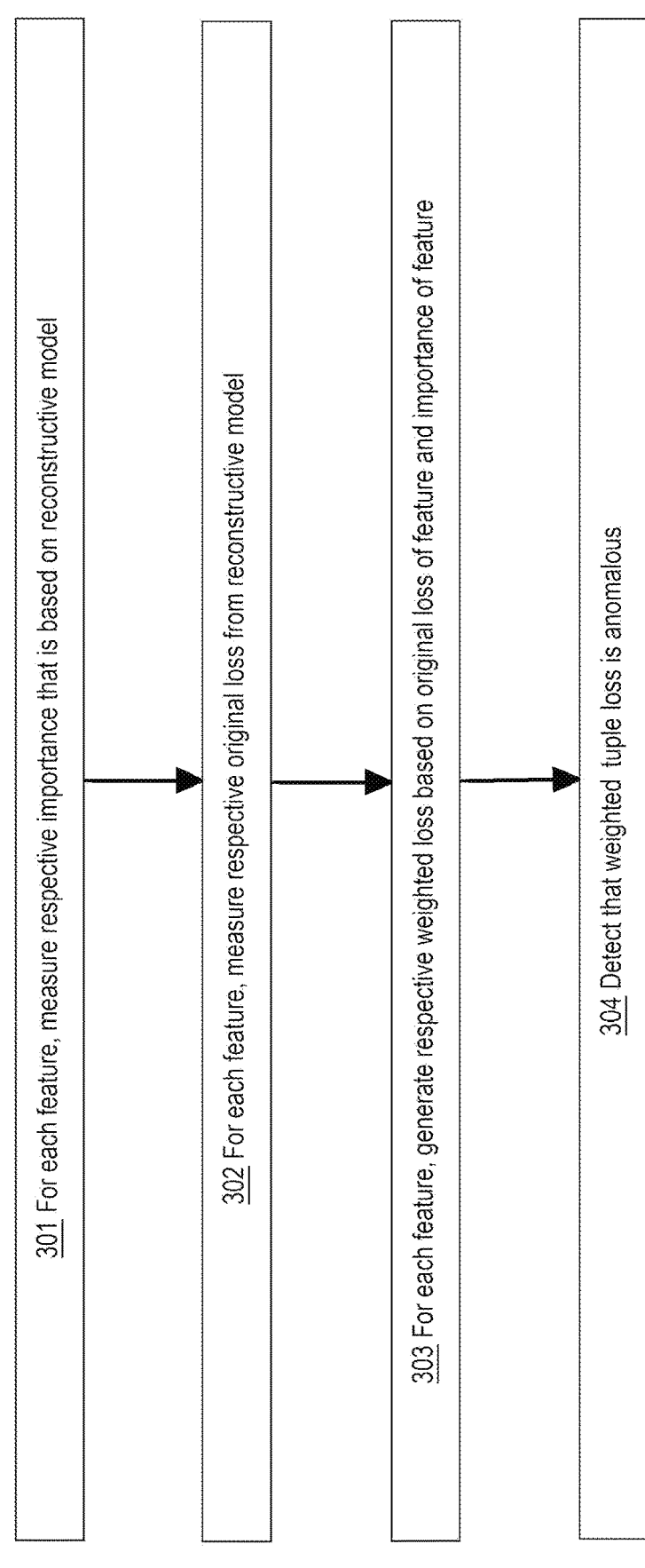
FIG. 3 is a flow diagram that depicts example computer activities that demonstrate various design choices in an implementation of the process of FIG. 2.

FIG. 3 is a flow diagram that depicts an example process that computer 100 may perform to measure and apply feature importances for anomaly detection in a production environment. As follows, the process of FIG. 3 is more general than the process of FIG. 2. FIG. 3 is discussed with reference to FIG. 1.

For each feature, step 301 measures a respective importance that is based on reconstructive model 140. As explained above, recalculating importances 130 by step 301 may occur immediately after (e.g. manually) labeling some new tuple(s) or immediately before inferencing a new tuple. Not all new tuples need be labeled. In an embodiment, only new positive inferences are labeled and thus classified as true or false.

Typically, a new tuple is not graded until sometime after reconstructive model 140 has generated an inference for the new tuple in the production environment. For anomaly detection (i.e. binary classification), a positive inference is anomalous, and a negative inference is non-anomalous. Compared to a label as a known correct inference for the new tuple, a positive inference may be further classified as a true positive (i.e. correct) or a false positive (i.e. wrong). Concept drift causes false positives and/or false negatives.

In an embodiment as explained later herein, step 301 may use statistics of inferences that are true/false and negative/positive as arithmetic factors for recalculating importances 130. If only new positive inferences are graded, then recalculating importances 130 by step 301 may use mathematics that are not based on statistics of negative inferences.

In an embodiment as explained later herein, step 301 may use tuple loss gradients of some (e.g. recently) labeled tuples to recalculate importances 130. In a PCA embodiment as explained later herein, step 301 may calculate gradients using matrix mathematics based on, as explained earlier and later herein, covariances of pairs of features. In an autoencoder embodiment as explained later herein, step 301 may calculate gradients using backpropagation as explained later herein. In a universal embodiment that can be used with any reconstructive model 140 of any (e.g. opaque) model architecture that provides original (i.e. unweighted) reconstruction loss as value losses and/or tuple loss, step 301 may calculate gradients using partial derivatives based on original reconstruction losses and values of features of labeled tuples.

In this example, tuple 110 may be new and neither inferenced nor labeled. For each feature of tuple 110, step 302 measures a respective original loss from reconstructive model 140 such as by measuring a difference between a reconstructed value of the feature and an input value of the feature as discussed earlier herein. For example, step 302 may apply reconstructive model 140 to tuple 110, as shown by arrow A, to cause reconstructive model 140 to generate an inference and, as shown by arrow B, original losses for features 121-122.

For each feature of tuple 110, step 303 generates a respective weighted loss based on the original loss of the feature and the importance of the feature. For example, step 303 may respectively apply importances 130 as coefficients to the original losses of features 121-122 to multiplicatively generate respective weighted losses of the features.

Step 304 detects that weighted tuple loss for tuple 110 is anomalous when an anomaly threshold is exceeded as shown by arrow D and the decision diamond in FIG. 1. For example, weighted value losses of tuple 110 may be summed or averaged to calculate a weighted tuple loss such as by mean squared error (MSE).

4.0 Example Loss Weighting Formulae

FIG. 4 depicts example mathematical formulae 401-406 that computer 100 may apply to prepare or use feature importances 130 in an embodiment. FIG. 4 is discussed with reference to FIG. 1.

In an embodiment, calculating importances 130 occurs in two phases that are gradient measurement and weight normalization. In a neural network embodiment such as an autoencoder, gradient measurement may calculate gradients using backpropagation as explained later herein. Unlike conventional backpropagation that adjusts reconstructive model 140 during training, backpropagation here is used solely to calculate gradients and neither adjusts nor trains reconstructive model 140.

In a universal embodiment that can be used with any reconstructive model 140 of any (e.g. opaque) model architecture that provides original (i.e. unweighted) reconstruction loss as value losses and/or tuple loss, gradients may instead be directly calculated using partial derivatives based on original reconstruction losses and values of features of labeled tuples.

To calculate gradient, a principal component analysis (PCA) embodiment may instead use PCA formula 403 that is derived from PCA formulae 401-402 that are demonstrative and not actually calculated. Formula 403 calculates gradients using matrix mathematics based on, as explained earlier and later herein, covariances of pairs of features. In a neural network embodiment such as an autoencoder, gradients may be calculated using backpropagation as explained later herein and without formula 403.

At the heart of PCA is a two-dimensional matrix such as a singular value decomposition (SVD) with: a) values that are arranged into one column of values per feature and one row of values per feature, and b) each value in a row or column is a covariance between: c) the feature of the column or row that contains the value paired with d) every other feature individually. Because most features are nearly or entirely irrelevant to inferencing such as anomaly detection, most columns and/or rows of the matrix are irrelevant. Instead, only a truncated matrix that may be missing some rows and/or columns may be used for acceleration without loss of accuracy. In an embodiment, a hyperparameter of the PCA model declares a count or fraction of most important features to retain in the truncated matrix, which may entail sorting features by importances 130.

Demonstrative formula 401 has two purposes: a) calculate gradient and b) convert from covariances to feature variances. Formula 401 calculates a two-dimensional gradient matrix from a two-dimensional covariance matrix. According to the following algebraic terms, formula 401 calculates gradients based on the two-dimensional matrix of an already trained PCA model, and that matrix may be a so-called latent space.

w is the truncated two-dimensional matrix.

$w^T$ is w transposed.

I is the identity matrix for w.

G is a two-dimensional matrix of gradient in a space of features

In the above terms: a) $w^T$ and I convert from covariances to feature variances, b) the constant two calculates gradient, and c) G is feature variance gradients, not feature-pair covariance gradients.

Demonstrative formula 402 calculates gradients at known (e.g. recently) graded tuples according to the following algebraic terms.

X is the known graded tuples.

N is a count of features.

g is a one-dimensional vector of feature variance gradients.

PCA formula 403 is derived from demonstrative formulae 401-402 and calculates feature variance gradients. In formula 403, MSE is mean squared error.

Formulae 404-405 are used to recalculate importances 130 based on known recently labeled (true and false) positive tuples. Formulae 404-406 are universal and can be used with any reconstructive model architecture and with gradients measured in any way. Formula 404 calculates, based on loss gradients, a z-score for each feature that indicates a correlation between the feature and the accuracy of reconstructive model 140 based on comparing inferences for known tuples by reconstructive model 140 to labels of the known tuples. Formula 404 uses the following algebraic terms.

$\overline{Y_{TP}}$ is a one-dimensional vector of average gradient of each feature for all true positives in the known tuples.

$\overline{Y_{FP}}$ is a one-dimensional vector of average gradient of each feature for all false positives in the known tuples.

Likewise, σ is a standard deviation for the gradient of each feature in true or false positives in the known tuples.

Each of the above terms is a statistic of a population of gradients for a feature. In particular and although not shown, the gradient of each feature is measured for each positive known tuple.

In formula 405, i is the index of the i-th feature. For each feature, formula 405 calculates a respective importance that is exponentially proportional to the z-score of the feature. In an embodiment, formula 405 is used to measure importances 130.

Recalculation of importances 130 by formulae 404-405 are invoked in response to recent grading of positive tuples, which may somewhat infrequently occur. Formula 406 compensates for concept drift by using the recalculated importances to adjust original value losses of features 121-

122. Unlike formulae 404-405, formula 406 is invoked for each new unlabeled tuple, which may frequently occur. Formula 406 is calculated according to the following arithmetic terms.

X is a stream or batch of new unlabeled tuples.

j is the index of the j-th tuple in X.

$\widetilde{X}$ is reconstructions of tuples in X.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
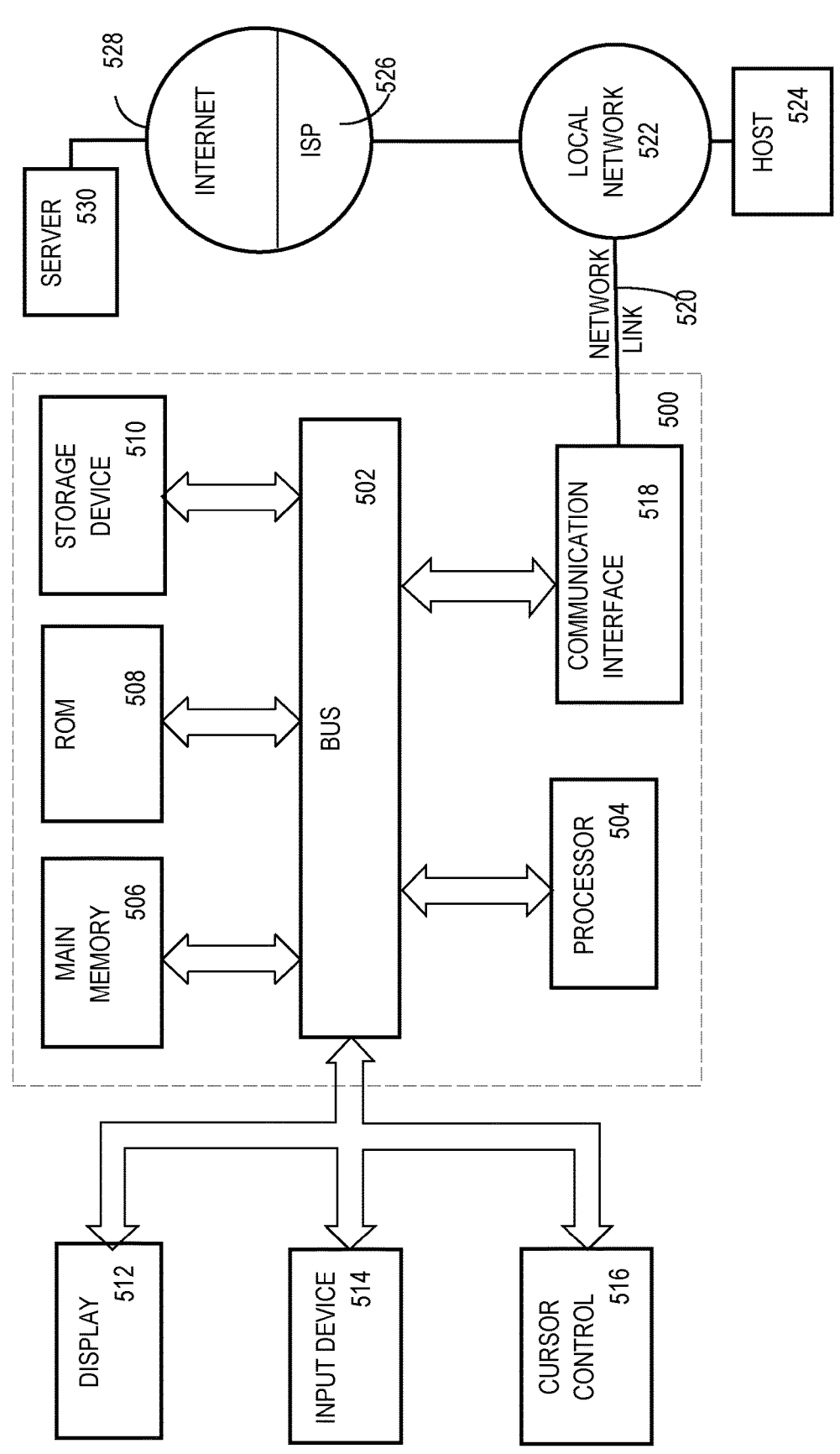
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
FIG. 6 is a block diagram that illustrates a basic software system that may be employed for controlling the operation of a computing system.

FIG. 6 is a block diagram of a basic software system 600 that may be employed for controlling the operation of computing system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or recon-figuration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and ser-vices, and which allows for rapid provisioning and release of resources with minimal management effort or service pro-vider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environ-ment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been pro-vided by an organization's own information technology department, to instead be delivered as service layers within a cloud environment, for use by consumers (either within or external to the organization, according to the cloud's public/ private nature). Depending on the particular implementa-tion, the precise definition of components or features pro-vided by or within each cloud service layer can vary, but common examples include: Software as a Service (SaaS), in which consumers use software applications that are running upon a cloud infrastructure, while a SaaS provider manages or controls the underlying cloud infrastructure and applica-tions. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applica-tions, and/or provision processing, storage, networks, and other fundamental computing resources, while an IaaS pro-vider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infra-structure and applications.

The above-described basic computer hardware and soft-ware and cloud computing environment presented for pur-pose of illustrating the basic underlying computer compo-nents that may be employed for implementing the example embodiment(s). The example embodiment(s), however, are not necessarily limited to any particular computing environ-ment or computing device configuration. Instead, the example embodiment(s) may be implemented in any type of system architecture or processing environment that one skilled in the art, in light of this disclosure, would under-stand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data repre-sentation or model artifact. A model artifact comprises parameters values, which may be referred to herein as theta values, and which are applied by a machine learning algo-rithm to the input to generate a predicted output. Training a machine learning model entails determining the theta values of the model artifact. The structure and organization of the theta values depends on the machine learning algorithm.

In supervised training, training data is used by a super-vised training algorithm to train a machine learning model. The training data includes input and a "known" output. In an embodiment, the supervised training algorithm is an itera-tive procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algo-rithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feed-forward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer $L-1$ to a layer L. Given the number of neurons in layer $L-1$ and L is $N[L-1]$ and $N[L]$, respectively, the dimensions of matrix W is $N[L-1]$ columns and $N[L]$ rows.

Biases for a particular layer L may also be stored in matrix B having one column with $N[L]$ rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer $L-1$ to L. An activation neuron represents an activation function for the layer that includes the activation function. An activation neuron in layer L corresponds to a row of weights in a matrix W for the edges between layer L and $L-1$ and a column of weights in matrix W for edges between layer L and $L+1$. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction loss is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

measuring, for each feature of a plurality of features, a respective importance that is based on a) a reconstructive model, b) a gradient of the feature, and c) at least one selected from the group consisting of: a count of true positives, a count of false positives, an exponential term, and a z-score;

wherein the gradients of the plurality of features are based on a first plurality of log entries of a console log or a server log;

measuring, for each feature of the plurality of features in a second plurality of log entries of the console log or the server log, a respective original loss from the reconstructive model;

generating, for each feature of the plurality of features, a respective weighted loss of a plurality of weighted losses, wherein the weighted loss is based on: the original loss of the feature and the importance of the feature;

detecting, based on the plurality of weighted losses, that an anomalous subset from the second plurality of log entries of the console log or the server log are anomalous;

recording, for each log entry from the anomalous subset, a respective label that indicates a true positive or a false positive;

replacing, in the first plurality of log entries of the console log or the server log, a subset of the first plurality of log entries of the console log or the server log with the anomalous subset;

measuring, based on said replacing, recalculated importances of the plurality of features;

generating, based on the recalculated importances of the plurality of features and a plurality of original losses for a new log entry, a new plurality of weighted losses; and detecting, based on the new plurality of weighted losses, that the new log entry is anomalous;

wherein the method is performed by one or more computers after the reconstructive model was trained.

2. The method of claim 1 wherein said measuring the importance of the feature comprises measuring a plurality of gradients for the feature.

3. The method of claim 2 wherein the plurality of gradients for the feature is based on the reconstructive model.

4. The method of claim 2 wherein:

the method further comprises the reconstructive model generating a respective inference for each tuple of a plurality of tuples;

each gradient of the plurality of gradients for the feature is based on a respective tuple of the plurality of tuples.

5. The method of claim 1 wherein the respective importance is further based on an eigenvector.

6. The method of claim 5 wherein the respective importance is further based on at least one selected from the group consisting of:

a loss gradient, a gradient for the feature of the importance, a backpropogation, and a sum or average of original losses.

7. The method of claim 1 further comprising measuring, for each feature of a plurality of features, a respective second importance that is based on said labels of the log entries from the anomalous subset that indicate a true positive or a false positive.

8. The method of claim 1 further comprising measuring, for each feature of a plurality of features, a respective second importance that is based on said plurality of weighted losses.

9. The method of claim 1 wherein said reconstructive model is one selected from the group consisting of a principal component analysis (PCA), a recurrent neural network (RNN), a variational autoencoder (VAE), and an incremental PCA (IPCA).

10. One or more computer-readable non-transitory media storing instructions that, when executed by one or more processors, cause after a reconstructive model was trained:

measuring, for each feature of a plurality of features, a respective importance that is based on a) the reconstructive model, b) a gradient of the feature, and c) at least one selected from the group consisting of: a count of true positives, a count of false positives, an exponential term, and a z-score;

wherein the gradients of the plurality of features are based on a first plurality of log entries of a console log or a server log;

measuring, for each feature of the plurality of features in a second plurality of log entries of the console log or the server log, a respective original loss from the reconstructive model;

generating, for each feature of the plurality of features, a respective weighted loss of a plurality of weighted losses, wherein the weighted loss is based on: the original loss of the feature and the importance of the feature;

detecting, based on the plurality of weighted losses, that an anomalous subset from the second plurality of log entries of the console log or the server log are anomalous;

recording, for each log entry from the anomalous subset, a respective label that indicates a true positive or a false positive;

replacing, in the first plurality of log entries of the console log or the server log, a subset of the first plurality of log entries of the console log or the server log with the anomalous subset;

measuring, based on said replacing, recalculated importances of the plurality of features;

generating, based on the recalculated importances of the plurality of features and a plurality of original losses for a new log entry, a new plurality of weighted losses; and detecting, based on the new plurality of weighted losses, that the new log entry is anomalous.

11. The one or more computer-readable non-transitory media of claim 10 wherein said measuring the importance of the feature comprises measuring a plurality of gradients for the feature.

12. The one or more computer-readable non-transitory media of claim 11 wherein the plurality of gradients for the feature is based on the reconstructive model.

13. The one or more computer-readable non-transitory media of claim 11 wherein:

the instructions further cause the reconstructive model generating a respective inference for each tuple of a plurality of tuples;

each gradient of the plurality of gradients for the feature is based on a respective tuple of the plurality of tuples.

14. The one or more computer-readable non-transitory media of claim 10 wherein the respective importance is further based on an eigenvector.

15. The one or more computer-readable non-transitory media of claim 14 wherein the respective importance is further based on at least one selected from the group consisting of:

a loss gradient, a gradient for the feature of the importance, a backpropogation, and a sum or average of original losses.

16. The one or more computer-readable non-transitory media of claim 10 wherein the instructions further cause measuring, for each feature of a plurality of features, a respective second importance that is based on said labels of the log entries from the anomalous subset that indicate a true positive or a false positive.

17. The one or more computer-readable non-transitory media of claim 10 wherein the instructions further cause measuring, for each feature of a plurality of features, a respective second importance that is based on said plurality of weighted losses.

18. The one or more computer-readable non-transitory media of claim 10 wherein said reconstructive model is one selected from the group consisting of a principal component analysis (PCA), a recurrent neural network (RNN), a variational autoencoder (VAE), and an incremental PCA (IPCA).

* * * * *